(12) United States Patent
Shifman et al.

(10) Patent No.: US 10,146,455 B2
(45) Date of Patent: Dec. 4, 2018

(54) DEVICE, SYSTEM AND METHOD FOR STORING DATA

(71) Applicant: OSR Enterprises AG, Cham (CH)

(72) Inventors: Orit Shifman, Cham (CH); Elhanan Shifman, Petach-Tikva (IL)

( * ) Notice: Subject to any disclaimer, the term of this patent is extended or adjusted under 35 U.S.C. 154(b) by 4 days.

(21) Appl. No.: 15/324,710

(22) PCT Filed: Jul. 7, 2015

(86) PCT No.: PCT/EP2015/065418
§ 371 (c)(1),
(2) Date: Jan. 8, 2017

(87) PCT Pub. No.: WO2016/005355
PCT Pub. Date: Jan. 14, 2016

(65) Prior Publication Data
US 2017/0212701 A1    Jul. 27, 2017

Related U.S. Application Data (60) Provisional application No. 62/021,736, filed on Jul. 8, 2014.

(51) Int. Cl.
*G06F 3/06* (2006.01)
*G06F 11/14* (2006.01)
(Continued)

(52) U.S. Cl.
CPC ............ *G06F 3/0619* (2013.01); *G06F 3/065* (2013.01); *G06F 3/067* (2013.01); *G06F 3/0631* (2013.01);
(Continued)

(58) Field of Classification Search
CPC .... G06F 3/0619; G06F 3/0631; G06F 3/0638; G06F 3/065; G06F 3/0655; G06F 3/067;
(Continued)

(56) References Cited

U.S. PATENT DOCUMENTS

| | | | | |
|---|---|---|---|---|
| 7,337,331 B2* | 2/2008 | Yoshida | ................. | G06F 11/30 713/193 |
| 7,739,465 B2* | 6/2010 | Kameyama | ......... | G06F 11/1076 711/161 |

(Continued)

FOREIGN PATENT DOCUMENTS

| | | |
|---|---|---|
| EP | 2725491 A1 | 4/2014 |
| EP | 2743821 A1 | 6/2014 |

OTHER PUBLICATIONS

International Search Report and Written Opinion issued in related PCT patent application PCT/EP2015/065418 dated Sep. 9, 2015. 10 pages.

*Primary Examiner* — Gary J Portka
(74) *Attorney, Agent, or Firm* — Birch, Stewart, Kolasch & Birch, LLP.

(57) ABSTRACT

Aspects of embodiments relate to a system for decentralized and distributed storing of data. The system comprises an application provider operative to provide a data storage (DTS) engine that is configured to generate data fragments that are associated with a source dataset received at an end-user data source (DT) device. The DTS engine is also configured such that the generated data fragments are stored on a multitude of end-user DT devices. The DTS engine is further configured to reconstruct, based on the data fragments, the source dataset.

17 Claims, 4 Drawing Sheets

(51) Int. Cl.
*G06F 11/20* (2006.01)
*G06F 12/14* (2006.01)

(52) U.S. Cl.
CPC ........ *G06F 3/0638* (2013.01); *G06F 11/1448* (2013.01); *G06F 11/1458* (2013.01); *G06F 11/2094* (2013.01); *G06F 12/1408* (2013.01); *G06F 2212/402* (2013.01)

(58) Field of Classification Search
CPC ............... G06F 3/0683; G06F 12/1408; G06F 2212/402
USPC ........................................... 711/162; 714/6.2
See application file for complete search history.

(56) References Cited

U.S. PATENT DOCUMENTS

| | | | |
|---|---|---|---|
| 8,656,125 B2 * | 2/2014 | Binzinger | G06F 11/2094 707/634 |
| 2010/0274983 A1 | 10/2010 | Murphy et al. | |
| 2013/0275695 A1 | 10/2013 | Ponsford et al. | |

* cited by examiner

DEVICE, SYSTEM AND METHOD FOR STORING DATA

CROSS-REFERENCE TO RELATED APPLICATIONS

This application is a Continuation-in-Part patent application, which is a national phase entry of International Application WO2016005355, and which claims priority of U.S. Provisional Patent application 62/021,736, all of which are incorporated herein by reference in their entirety.

TECHNICAL FIELD

Embodiments disclosed herein relate in general to devices, systems and methods for storing data.

BACKGROUND

The use of computerized devices has become increasingly ubiquitous and is coupled with an ever increasing reliance of users on such devices in performing for example work-, study- or leisure-related activities. This increasing reliance is accompanied by a growing amount of data to be processed and stored. Any loss of data may thus be disastrous in terms of resources required to reconstruct the lost data and may therefore severely impair and disrupt the ability of users to continue engaging in their activities. Loss of data may be particularly disruptive to businesses and may therefore cause them significant monetary losses. Correspondingly, reliably storing and backing up data and having instant access to the data is crucial for enabling quick recovery from any data loss. Recent developments in computing enable the user to store and back up data using "cloud computing" or the "cloud" of a multitude of users. The term "cloud computing" and "cloud" as used herein may refer to the hosting of applications by a provider using one or more host computers accessible by the user via a communication network (e.g., the internet) such that the actual installation of the applications by the user is not required.

The provider of the applications maintains one or more server farms. A server farm is a collection of computer servers installed at a designated location. The collection of computer servers includes thousands of computerized equipment in order to meet the data storage and processing capabilities required to ensure and maintain service to the user. User data that is stored in the cloud may be easily accessible by a user.

SUMMARY

Aspects of embodiments relate to a system for decentralized and distributed data storage. Example 1 includes a system comprising an application provider that is operative to generate or establish a data storage (DTS) engine. Accordingly, the system includes in some embodiments the DTS engine. Example 2 includes the subject matter of example 1, and optionally, wherein the DTS engine may be configured to generate data fragments associated with a source dataset received at an end-user data source (DT) device and wherein the DTS engine may further be configured such that the generated data fragments are stored on a multitude of end-user DT devices. Example 3 includes the subject matter of example 2 and, optionally, wherein the DTS may be configured to reconstruct, based on the data fragments, the source dataset. The DTS engine may be comprised in one or more devices of the system.

Example 4 includes the subject matter of any one of examples 1-3 and, optionally, wherein the system is configured to dynamically allocate data storage on the multitude of end-user DT devices.

Example 5 includes the subject matter of any one of examples 1-3 and, optionally, wherein the DTS engine is configured to dynamically generate data fragments associated with a respective source dataset on the multitude of end-user DT devices.

Example 6 includes the subject matter of any one of examples 1-4 and, optionally, wherein the DTS engine is configured to dynamically store data fragments associated with a respective source dataset on the multitude of DT devices.

Example 7 includes the subject matter of any of examples 1-5 and, optionally, wherein the DTS engine is configured to generate, with respect to the corresponding source dataset, at least two groups of data fragments, each group consisting of at least two different clusters of data fragments, and wherein the data of the first group is identical with the data of the second group. In other words, while the data in the at least two clusters may be descriptive of the same information, the data of one cluster may be arranged differently from the data of another cluster.

Example 8 includes the subject matter of example 6 and, optionally, wherein each group of data fragments may comprise or, alternatively, consist of at least two identical or substantially identical groups of data fragments. In other words, at least some or all source data may be cloned or copied. In an embodiment, the majority of the data fragments of a first group may differ from the data fragments of a second group. In an embodiment, some of the data fragment of a first group may be identical to or overlap with the data fragment of a second group.

Example 9 includes the subject matter of any one of examples 1-7 and, optionally, wherein the DTS engine is configured to operate in a first, backup mode, in which the source dataset remains intact; and in a second mode, in which the source dataset does not remain intact.

Example 10 includes the subject matter of any one of examples 1-8 and, optionally, wherein the DTS engine is configured to encrypt the data fragments.

Example 11 includes the subject matter of any one of examples 1-9 and, optionally, wherein the DTS engine is configured to provide a challenge-response protocol required for reconstructing the source data.

Example 12 includes the subject matter of any of examples 6-9 and, optionally, wherein the source dataset descriptive of information is divided up into one or more sets of data fragment groups in a manner such that the information represented by the source dataset is not reconstructible unless at least most or of each one of the groups of data fragments is accessible.

Aspects of embodiments also relate to a method for the decentralized and distributed storing of data. Example 13 includes a method comprising receiving a request to generate at least one (also: one or more) sets of data fragments of a respective at least one source dataset provided at a data source device; and storing the at least one data fragments on a multitude of end-user data target devices.

Example 14 includes the subject matter of example 13 and, optionally, providing at least one identifier for respectively associating the at least one set of data fragments with the corresponding at least one source dataset. A set of data fragments may herein also interchangeably refer to a set of data fragment groups, wherein each group of the set comprises data fragments.

Example 15 includes the subject matter of example 13 or 14 and, optionally, dynamically allocating storage on the multitude of DT devices.

Example 16 includes the subject matter of any one of examples 13-15 and, optionally, dynamically storing the set of data fragments on the multitude of DT devices.

Example 17 includes the subject matter of any one of examples 13-16 and, optionally, rendering the source dataset stored on the DS device non-accessible to a user of the DS device.

Example 18 includes a circuit for controlling a system for decentralized and distributed storing of data, the control circuit comprising: a first circuit for generating data fragments that are associated with a source dataset received at an end-user data source (DS) device of the system, a second circuit for storing the generated data fragments on a multitude of end-user data target (DT) devices of the system, and a third circuit for reconstructing, based on the data fragments, the source dataset.

Example 19 includes the subject matter of example 18 and, optionally, wherein the control circuit further comprising one or more circuits for performing any of the method steps outlined in any one of the Examples 13-17.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The invention is herein described, by way of example only, with reference to the accompanying drawings, wherein.

DETAILED DESCRIPTION

The following description of devices, systems and methods for storing and backing up data in a decentralized and distributed manner is given with reference to particular examples, with the understanding that such systems and methods are not limited to these examples. A data storage system for storing data according to embodiments may herein also be referred to as "decentralized and distributed data storage system" or DDS.

Figure 1:
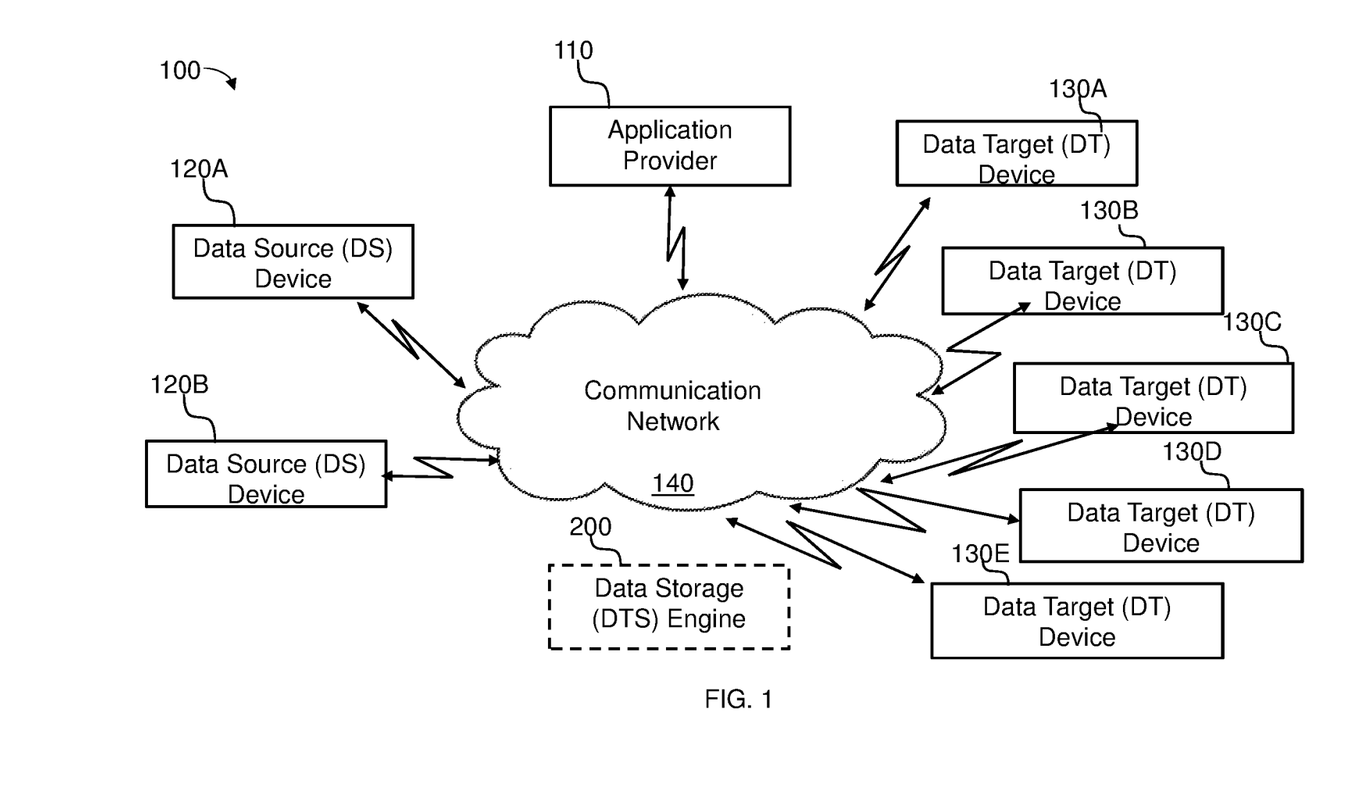
FIG. 1 is a schematic block diagram illustration of a data storage system, according to an embodiment.

Referring to FIG. 1, a data storage (DTS) system, herein referenced by alphanumeric label "100", may include an application provider 110, one or more data source (DS) devices 120 (e.g., DS devices 120A and 120B) at which a source dataset may be provided, and a multitude of data target (DT) devices 130 for storing a set of data fragments portions of the provided source dataset.

A first data fragment and a second data fragment may respectively correspond to a first and a second portion or selection of data of the source dataset. The first and the second data fragment of the set of data fragments may be stored on different locations, e.g., on different DT devices 130. Accordingly, the generated set of data fragments is a fragmented version of the source dataset.

An identifier may be employed for associating data fragments with the respective source dataset such that the latter can be reconstructed using the data fragments. It is noted that data fragments stored on one DT device do not suffice for reconstructing source data. In other words, at no time may a DT device store data fragments which, taken alone, can be used to reconstruct a source dataset. Moreover, a source dataset associated with an end-user may not be accessible to other end-users. Reconstruction of the source data may only be performed on the DS device that is associated with the end-user who requested the source-data reconstruction. The availability of the corresponding set of data fragments for reconstructing the source data is completely independent of the demand for the information represented by the source data by the general public. In other words, the popularity of the information is irrelevant to the availability of the associated set of data fragments.

An end-user authorized to access and use a source dataset may herein also be referred to as "administrator". Such end-user or administrator may for example be the creator and/or author of the data and/or, in the broadest sense, considered to be a provider of the source dataset. It is noted that expressions and grammatical variations of "storing data on a device"; "storing data in a device" and "storing data at a device" may be used interchangeably.

The term "multitude" as used herein in conjunction with users or end-users of DS device 120 and/or DT devices 130 may for example relate to tens, hundreds, thousands, tens of thousands or even millions of computerized end-user devices. Accordingly, the set of data fragments associated with a corresponding source dataset provided at DS device 120A for example may be stored in a decentralized and distributed manner on hundreds, thousands, tens of thousands or even millions of DT devices 130, for example, by establishing a corresponding peer-to-peer network. Data fragments of a given set may thus be stored on, e.g., at least 20, 50, 100, 500, 1,000, 10,000, 50,000, 100,000, 200,000, 300,000, 400,000, 500,000, 1,000,000, 10,000,000, 50,000,000, 100,000,000, 500,000,000 DT devices 130, and not on one more servers or servers farms that are associated with a single service or cloud provider entity. Correspondingly, fragmentation of source data and into the corresponding set of data fragments, as well as the reconstruction of the source data may be accomplished without the need or with substantially no need for centralized coordination by servers.

The peer-to-peer network may for example include an unstructured, structured or hybrid peer-to-peer network. It is noted that in order to simplify the discussion that follows, embodiments relating to the multitude of DT devices 130 may be exemplified by DT devices 130A-130E. As outlined herein below in greater detail, at least one or all of the multitude of DT devices 130 may also include the functionality of or operate as a DS device and at least one or all of DS devices 120 may also include the functionality of or operate as a DT device.

A computerized end-user device may include a multifunction mobile communication device also known as "smartphone", a personal computer, a laptop computer, a tablet computer, a server (which may relate to one or more servers or storage systems and/or services associated with a business or corporate entity, including for example, a file hosting service, cloud storage service, online file storage provider, peer-to-peer file storage or hosting service and/or a cyberlocker), personal digital assistant, a workstation, a wearable device, a handheld computer, a notebook computer, a vehicular device, a stationary device and/or a home appliances control system.

Application provider 110, DS devices 120 and DT devices 130 may communicate with each other over a communication network 140. DS devices 120 and DT devices 130 may include the functionality of or operate as nodes or peers of a peer-to-peer network architecture. DS devices 120 and/or DT devices 130 may take over or replace, at least temporarily, functionalities of application provider 110 in case, for example, the application provider server crashes or becomes otherwise inoperable.

Application provider 110 may be operative to enable the implementation of a method, process and/or operation for storing a source dataset provided at one or more DS devices 120 on the multitude of DT devices 130 in a distributed and decentralized manner as described herein. Such method, process and/or operation may herein be implemented by and/or referred to as a "data storage engine" or "DTS engine", referenced by alphanumeric label "200". System 100 may thus include DTS engine 200.

Figure 2:
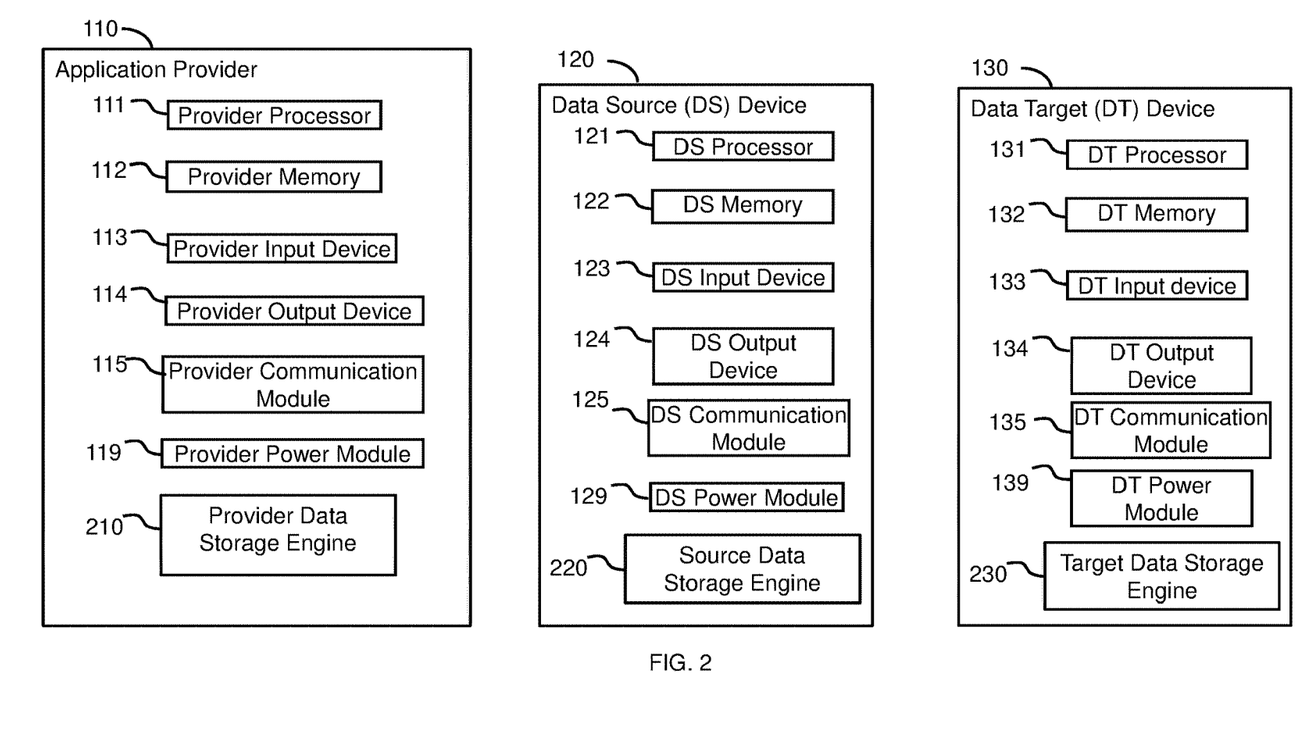
FIG. 2 is a schematic block diagram illustration showing the components of an application provider, a data source device and a data target device of the data storage system according to an embodiment.

Further referring to FIG. 2, application provider 110 may include a provider processor 111, a provider memory 112, a provider input device 113, a provider output device 114, a provider communication module 115, and a provider power module 119 for powering the various components of application provider 110. DS devices 120 may include a DS processor 121, a DS memory 122, a DS input device 123, a DS output device 124, a DS communication module 125, and a DS power module 129 for powering the various components of the DS device. In the discussion outlined herein, components of DS devices 120A-120B may be respectively referenced. For example, DS processors 121A-121B may be included in DS devices 120A-120B. DT devices 130 may include a DT processor 131, a DT memory 132, a DT input device 133, a DT output device 134, a DT communication module 135, and a DT power module 139 for powering the various components of the DT device. Components of DT devices 130A-130E may be respectively referenced. For example, DT memories 132A-132E may be included in DT devices 130A-130E. The various components of application provider 110, DS device 120 and DT device 130 may communicate with each other over one or more communication buses (not shown) and/or signal lines (not shown).

The term "processor" as used herein may additionally or alternatively refer to a controller. Such processor may relate to various types of processors and/or processor architectures including, for example, embedded processors, communication processors, graphics processing unit (GPU)-accelerated computing, soft-core processors and/or embedded processors.

According to some embodiments, provider memory 112, DS memory 122 and DT memory 132 may include one or more types of computer-readable storage media. Provider memory 112, DS memory 122 and/or DT memory 132 may include transactional memory and/or long-term storage memory facilities and may function as file storage, document storage, program storage, or as a working memory. The latter may for example be in the form of a static random access memory (SRAM), dynamic random access memory (DRAM), read-only memory (ROM), cache or flash memory. As working memory, provider memory 112, DS memory 122 and/or DT memory 132 may, for example, process temporally-based instructions. As long-term memory, provider memory 112, DS memory 122 and/or DT memory 132 may for example include a volatile or non-volatile computer storage medium, a hard disk drive, a solid state drive, a magnetic storage medium, a flash memory and/or other storage facility. A hardware memory facility may for example store a fixed information set (e.g., software code) including, but not limited to, a file, program, application, source code, object code, and the like. For the purposes of long-term storage, data fragments may be stored on such long-term memory.

Provider communication module 115, DS communication module 125 and DT communication module 135 may for example include I/O device drivers (not shown) and network interface drivers (not shown). A device driver may for example, interface with a keypad or to a USB port. A network interface driver may for example execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G including for example Mobile WIMAX or Long Term Evolution (LTE) advanced, and/or any other current or future communication network, standard, and/or system.

Provider memory 112, DS memory 122 and/or DT memory 132 may include instruction which, when executed e.g. by the respective provider processor 111 and/or DS processor 121 and/or DT processor 131, may cause the execution of the method, process and/or operation for storing at least one source dataset provided at the one or more DS device 120 on the multitude of DT devices 130 in a decentralized manner as described herein. Such method, process and/or operation may herein be implemented by DTS engine 200. According to some embodiments, some implementations and/or portions and/or processes and/or elements and/or functions of DTS engine 200 may be implemented by application provider 110, some of the DTS engine 200 may be implemented by the one or more DS devices 120 and some may be implemented by a DT device 130. Respective implementations and/or portions and/or processes and/or elements and/or functions of DTS engine 200 may herein be referenced by labels 210, 220 and 230 denoting "application DTS engine", "source DTS engine" and "target DTS engine", respectively, causing application provider 110, DS device 120 and/or DT device 130 to operate as disclosed herein. In some embodiments, the installation of DTS engines 220-230 on DS device(s) 120 and DT devices 130 and/or the registration of DS device(s) 120 and DT devices 130 with application provider 110 may be required for enabling the respective DS devices 120 and DT devices 130 to be able to employ the data storage methods and processes disclosed herein.

To simplify the discussion that follows, methods and processes disclosed herein may be outlined herein in conjunction with DTS engine 200. DTS engine 200 may be realized by one or more hardware, software and/or hybrid hardware/software modules.

DTS engine 200 may configure the one or more DS devices 120 and the multitude of DT devices 130 such that data or "source data" descriptive of information provided at one DS device (e.g. via DS input device 123A of first DS device 120A) may be stored in a distributed manner on the multitude of DT devices 130 by a set of data fragments that is associated with the source data. Otherwise stated, a plurality of sets of data fragments stored on the multitude of DT devices 130 may be respectively associated with a plurality of source datasets provided at the one or more DS devices 120. Each set of data fragments may enable the reconstruction of the corresponding set of source data. For instance, a set comprising first, second and third data fragments associated with a respective source dataset provided at DS device 120A may be stored on DT devices 130A-130C, respectively. A user associated with DS device 120A may request authorization to reconstruct the source dataset based on the respective set of data fragments stored at DT devices 130A-130C, for example, in the event of loss and/or corruption of the source dataset. If such authorization is granted, the source dataset may be reconstructed for example at first DS device 120A based on the set comprising the first, second and third data fragments. Reconstructing a source dataset may include providing the corresponding set of data fragments from DT devices 130 to the DS device 120 identified as the origin of the source dataset. Providing the set of data fragments from DT devices 130 for reconstructing the respective source dataset for making accessible the respective information represented by the source dataset may include, for example, allowing access to the respective set of data fragments for fetching and/or loading and/or copying and/or sending to and/or updating thereof on the one or more DS devices 120. In some embodiments, fragmentation may relate to generating a corresponding set of data fragments that is associated with a corresponding source dataset while keeping at least a part or substantially all of the corresponding source dataset intact. In the latter case, the set of data fragments may in other words be referred to as a partial or full backup of the source dataset. Such process and/or method of storing data may herein be referred to as a "first storage" or "backup mode". Hence, at least a part or of all of the information represented by the source dataset may also after fragmentation still be accessible by the user without the need of performing reconstruction based on the set of data fragments. For example, in the first, "backup" mode, a source dataset may be at least partially or fully retained on DS device 120B and DTS engine 200 may generate a set of data fragments that is associated with the source dataset. The provided source dataset may still be stored on DS device 120B and the correspondingly associated set of data fragments may for example be stored on DT devices 130A-130E. Alternatively, fragmentation may in some embodiments relate to generating a set of data fragments that is associated with a corresponding source dataset and rendering substantially all of the respective source dataset stored on, e.g., DS device 120B, substantially non-accessible, e.g., through deletion and/or overwriting and/or corruption and/or otherwise manipulation of the source dataset. As a consequence, the user may only be able to access the information that was originally represented by the source dataset through reconstruction of the thereof using the respective set of data fragments. Such process and/or method of data storage may herein be referred to as a "second storage mode". DTS engine 200 may allow the user to select between the first and the second storage mode.

Fragmentation and reconstruction of the source dataset may be managed in a decentralized manner. A computerized device may have to be registered in DTS system 100 in order to be able to function as a DT device 130. The term "registered" and "registration" as used herein may relate to becoming part or a node of the peer-to-peer network by employing, for example, a tracker such as a peer routing table. Such tracker may for example use data descriptive of number of users per country for managing the peer-to-peer network and for polling the nodes. Correspondingly, registration to system 100 may be performed in a substantially decentralized manner, i.e., not with a central server or server system but, for example, primarily or only in communication with the end-user device itself through a data storage engine. Registration may for example include (e.g., require) the installation of a data storage (DTS) engine on the computerized end-user device to become a DT device 130. For example, only a computerized end-user device that employs a target DTS engine 230 may be identifiable as a DT device 130 and thus be taken into account and/or screened by a source DTS engine 220 of a DS device 120 for storing the source dataset in a defragmented manner.

It is noted that a set of data fragments associated with a respective source dataset may have various data structures. The set of data fragments may for example include at least two identical data fragments that are respectively stored on at least two DT devices 130. It should be noted that term "identical" may also encompass the meaning of the term "substantially identical".

In some embodiments, the set of data fragments may include a plurality of groups of identical data fragments. Each group of data fragments may consist of at least two identical or substantially identical data fragments. However, the data fragments of a first group differ from the data fragments of a second group. A part of one data fragment of a first group may be identical to or overlap with a part of a data fragment of a second group.

Identical data fragments of a given group of the plurality of groups are stored on a respective selected number of DT devices 130. The number of selected DT devices 130 may be smaller than the total number of DT devices 130 available. In other words, constraints may have to be met regarding the minimum and maximum number of selected DT devices 130 being employed for storing identical data fragments of the same group. Fragmentation may be performed such that a minimum number of a plurality of groups of data fragments is created that ensures that the probability of data loss and/or corruption of a data fragment is minimized or equal to 0, for a given time period. For instance, at least 100 data fragment groups may be created. The minimum number of data fragment groups may depend, for example, on the number of DT devices 130 available.

The probability for data corruption of a data fragment may be expressed as outlined herein below.

1. a, (0≤a≤1) denotes the probability that a storage device containing a file with size d [bits]d[bits] becomes damaged
2. N denotes the total number of data fragments
3. n denotes the number of data fragments cloning The probability for corruption of a data fragment in the system during a time interval may be expressed as follows:

$$P_{\Delta t} = \frac{\Delta t}{\tau} \quad (1)$$

wherein $\Delta t$ denotes the time interval and $$\frac{1}{\tau}$$

the probability density function (PDF) for data or storage corruption storing the data fragment. Correspondingly, the probability for data fragment to remain intact in the system during the time frame may for example be expressed as follows:

$$P_{\Delta t\ survivle}(t) = \left(1 - \frac{\Delta t}{\tau}\right)^{\frac{t}{\Delta t}} \quad (2)$$

Assuming $\Delta t$ tending to zero:

$$P_s(t) = \lim_{\Delta t \to 0} \left(1 - \frac{\Delta t}{\tau}\right)^{\frac{t}{\Delta t}} = e^{-\frac{t}{\tau}} \quad (3)$$

The meaning of this expression is that $P_s(t)$ is the probability for the survival of the fragment between t=0 and t. For t=0 it follows that $P_s(0)=1$. Accordingly, the probability $P_c(t)$ for a single fragment corruption in the system as a function of time may, for example, be expressed as follows:

$$P_c(t) = 1 - e^{-\frac{t}{\tau}} \quad (4)$$

and the probability P for corruption of a data fragment in the system in a time interval ranging from $t_1$ to $t_2$ may, for example, be expressed by the following equation:

$$P_{t_1 \to t_2} = e^{-\frac{t_1}{\tau}}\left(1 - e^{-\frac{t_1 - t_2}{\tau}}\right) \quad (5)$$

Probability for loss of data fragments in the system during the time interval may, for example, be expressed as follows:

$$(P_{t_1 \to t_2})^n = \left(e^{-\frac{t_1}{\tau}}\left(1 - e^{-\frac{t_1 - t_2}{\tau}}\right)\right)^n = a^n \quad (6)$$

Correspondingly, the probability for loss or corruption of all (n) data fragments cloning in the system and that contribute to total data loss without the ability to reconstruct the file in the time interval may, for example, be expressed as follows by a Poisson Probability Function:

$$P_{Data\ Loss} = \sum_{k=1}^{N} a^{nk}(1 - a^{n(N-k)}) \frac{N!}{k!(N-k)!} \quad (7)$$

It is noted that any other function may be used that is descriptive of a suitable probability distribution.

Data volume in a system allocated to one user may for example be expressed as follows:

$$D_{system} = \frac{nD}{N} [\text{bits}] \quad (8)$$

$P_{Data\ Loss}$ and $D_{system}$ shall be minimized.

An increase in N correspondingly increases the probability for data loss in the system. On the other hand, an increase in N results in a corresponding decrease of required storage volume $D_{system}$ for the data fragments. Moreover, increasing n correspondingly increases magnitude of $D_{system}$. However, increasing n also causes probability $P_{Data\ Loss}$ to decrease exponentially. When knowing the available total storage volume in the peer-to-peer network (e.g., the sum of the individual storage of DT devices 130 available) as a function of time and by defining the desired probability value for potential data loss for a given time interval, N can be derived from equation 1.7. The number of selected DT devices 130 employed for storing identical data fragments may depend on the total number of DT devices 130 available, e.g., registered with DTS system 100. A source dataset may for example be fragmented into five data fragments. Of the five data fragments, three data fragments may be identical and thus be referred to as a first group of data fragments. The first, second and third data fragment of the first group may be stored on DT device 130A, 130B and 130C, respectively. The remainder fourth and fifth data fragments may be identical but differ from the data fragments of the first group. The remainder two data fragments may thus be referred to as a second group of data fragments. The fourth and fifth data fragment of the second group may for example be respectively stored on DT devices 130A and 130B, on DT devices 130C and 130D, or on DT devices 130D and 130E.

DTS engine 200 may be operative to identify through monitoring if the number of identical fragments of a data fragment group falls below a minimum threshold. If that is the case, a corresponding additional number of DT devices 130 may be engaged for storing additional copies of the data fragment to compensate for any loss in backup. For that purpose, a DT devices 130 that stores data fragments of one group may be assigned the task to store data fragments of another group instead.

As already mentioned herein, DTS engine 200 may enable application provider 110 to configure for example DS device 120A such that various data fragments associated with the source dataset provided at DS device 120A are stored on the multitude of DT devices 130. The source dataset descriptive of information may be divided up into a multitude of data fragments by DTS engine 200 in a manner such that the information may not be reconstructible unless at least one data fragment of most or of each one of the groups of identical data fragments is accessible. Fragmentation may for example be performed such that each data fragment is sufficiently large such that the reconstruction of the source dataset is not possible without having access to all data fragments.

The set of data fragments may not comprise all source data. For example, some data of the source dataset may be discarded during fragmentation. For instance, the set of data fragments may include data that encodes in a compressed manner information represented by the source dataset. DTS engine 200 may be nevertheless enable reconstruction of the source dataset. In some embodiments, the source dataset may only be partially reconstructed. Information represented by the reconstructed source dataset may for example be compressed compared to the information represented by the original source dataset.

According to some embodiments, a source dataset may be fragmented according to one or more criteria determined, e.g., by users associated with the DT devices 130 and/or by the administrator of source data. The one or more criteria may in some embodiments, reflect the fragmentation options outlined herein.

According to some embodiments, storage may be allocated at DT devices 130 for storing a set of data fragments. DTS engine 200 may for example be operative to cause DT devices 130 to allocate storage for storing the set of data fragments.

For example, DTS engine 200 may be operative to screen DT devices 130A-130E registered with application provider 110 and determine which of DT devices 130A-130E have storage available for storing source data. DTS engine 200 may determine that DT devices 130A-130C have available storage. Based on the determined available storage at DT devices 130A-130C, DTS engine 200 may select the DT devices suitable for storing the set of data fragments associated with the source dataset. DTS engine 200 may for example select DT device 130A and DT 130B, allocate storage at DT devices 130A-130B, and cause storage of respective set of data fragments on DT devices 130A-130B.

According to some embodiments, storage may be allocated at DT devices 130 based on an input received at the DT devices, e.g., from users associated therewith. The DT end-user may for example allocate storage of a file hosting service, cloud storage service, online file storage provider, peer-to-peer file storage or hosting service and/or a cyber-locker and/or allocate storage on his/her DT device.

A user of DT device 130D may be disbursed in money and/or monetary equivalent in exchange for allocating storage DT device 130D. The term "money and/or monetary equivalent" may herein be referred to as "reward". The reward may be determined based on the size of the allocated storage and/or the time period the storage is made available. For example, the larger the allocated storage and/or the longer the allocated storage is made available to an administrator of a source dataset, the higher may be the reward paid to the user. In some embodiments, reconstructing a source dataset may be performed by DTS engine 200 responsive to receiving payment at the DTS engine 200, for example, from the administrator of the source dataset. The required amount to be paid for reconstructing the source dataset from the associated set of data fragments may be constant for each source dataset retrieval occurrence, or vary depending on the amount of data fragments of each set and/or the size of the source dataset. In some embodiments, payment may include a base fee and a variable fee.

Storage allocation for storing a set of data fragments may be made in a static or dynamic manner. The term "static allocation" as well as grammatical variations thereof may also encompass the meaning of the expression "substantially static allocation". Static storage allocation may for example relate to fixing the size of storage allocated in a memory of a DT device for storing a set of data fragment associated with a source dataset. For example, a first and second amount of storage may be allocated at second and third DT devices 130B and 130C for storing a set of data fragments associated with a data source set. Dynamic allocation of storage may for example include making adjustments, at different time stamps, at DT devices 130 of the amount of storage allocated during the storing of data fragments. In other words, the expression "dynamically" and grammatical variations thereof may refer to invoking changes to the system at different time stamps over a period of time. These time stamps may be selected pseudo-randomly or, alternatively, predetermined according to a non-pseudo random rule.

According to some embodiments, a set of data fragments may be stored statically (which may encompass the meaning of the expression "substantially statically") on the allocated storage of DT devices 130. Aspects of statically storing data may relate to the storing of a set of data fragments in the same DT memory until reconstruction of the source dataset is requested. For example, a first, second and third data fragment associated with a data source set may be stored in DT memories 132A-132C of respective DT devices 130A-130C as long as DTS engine 200 does not receive a request to reconstruct the information represented by the source dataset. Such a request may for example be received from an input from an administrator of the source dataset. Upon authorization of such a request, the respective data fragments may be employed for reconstruction or recovering of the source dataset, e.g., at DS device 120A, in manner that allows access to the corresponding information. Additionally or alternatively, statically storing data may relate to continuously storing data in the same memory over a relatively prolonged period of time. For instance, the same data fragment may be continuously stored for at least one hour in the same memory.

According to some embodiments, a set of data fragments may be stored dynamically on DT devices 130, for example, by constantly varying the structure of the set of data fragments of a corresponding source dataset. In some embodiments, a data fragment may be further fragmented and/or rearranged by DTS engine 200.

Storage allocation may be static while the storing of data may be performed dynamically. In some embodiments, storage allocation and the storing of the set of data fragments may be performed dynamically, taking into account, for example, the constraints imposed by the storage allocation.

Storage allocation and/or fragmentation and/or rearranging of data for static and/or dynamically storing thereof may be performed in a predetermined manner and/or in a random manner. It is noted that the term "random" as used herein may also encompass the meaning of the term "substantially random" and/or "pseudo-random" and/or "about random" and/or "approximately random". For example, fragmentation of data (e.g., of source dataset and/or data fragments) may be executed such that the size of the data fragments changes each time in a predetermined manner. Alternatively, fragmentation may be executed such that the size of the data fragments changes in a random manner. In some embodiments, some fragmentation may occur in a predetermined and some in a random manner. For example, the fragmenting of source dataset and/or additional fragmenting of data fragments (and optionally the storing of data fragments) may be executed at equal intervals, different intervals or at random intervals. Such intervals may be based, e.g., on the algorithm outlined herein. For example, the source dataset may be repeatedly fragmented at a respective plurality of fragmentation occurrences, the timing of which may be selected in a predetermined and/or random manner. For example, at T1, DTS engine 200 may fragment the source dataset for storage of respective first, second and third data fragments on DT devices 130A-130C. At T2(>T1), DTS engine 200 again fragment the source dataset for storing different first, second and third data fragments on DT devices 130A-130C. The timing (i.e., T1 and T2) and/or the size of the data fragments may be predetermined or random.

In some embodiments, target DT devices 130 may for example be configured to change in mutual coordination the data fragments stored in their respective DT memories 132. For example, at first time stamp T1, a first and second data fragment (e.g., of a group of data fragments or of two different groups) may be initially stored respectively on DT devices 130A and 130B. At time stamp T2 (>T1), the first and second data fragments may be stored at DT devices 130B and 130C, respectively. At time stamp T3 (>T2), the first and second data fragments may be stored at DT devices 130C and 130A, respectively. After time stamp T3, the sequence may be repeated or another dynamic data storage sequence may be executed. The time stamps T1-T3 may be predetermined or random.

According to some embodiments, repeated fragmentation of a source dataset and/or further fragmentation of a data fragment may occur responsive to determining that additional DT devices become available. DTS engine 200 may for example determine that additional storage becomes available at DT devices 130D and 130E. Fragmentation of a source dataset provided at DS device 120A may thus be repeated to obtain another first, second and third data fragment and to additionally obtain a fourth data fragment which are respectively stored at DT devices 130A-130D. Additionally or alternatively, a data fragment may be further fragmented by DTS engine 200. For example, a first data fragment associated with the source dataset may be further fragmented for storing the resulting data fragments, e.g., at DT device 130A and DT device 130E, or at DT devices 130 other than DT device 130A.

According to some embodiments, some data fragments of a set of data fragments may be stored on the one or more DS devices 120. For example, a source dataset associated with DS device 120A may be fragmented into a multitude of data fragments which may for example be stored on DS devices 120A-120B and on DT devices 130C-130E. Correspondingly, one or more DS devices 120 at which the source dataset may be provided may serve as DT devices 130 for storing data fragments.

In some embodiments, a DS device may be excluded from serving as a DT device for a set of data fragments associated with a source dataset that originated from the said DT device.

According to some embodiments, storing of a set of data fragments on DT devices 130 may occur responsive to the providing of the source dataset at the one or more DS devices 120. For example, a set of data fragments associated with the source dataset provided at DS device 120A may be stored concurrently or in real-time on DT devices 130B-130E with the providing of the source data. It is noted that the expressions "concurrently" and "in real-time" as used herein may also encompass the meaning of the expression "substantially concurrently" and "substantially in real-time".

According to some embodiments, DTS engine 200 may enable the protection of the various data fragments stored at DT devices 130 such to prevent unauthorized use of the data.

The term "data protection" and/or "applying data protection" as used herein as well as grammatical variations thereof may include the employment of non-cryptographic data protection methods such as, for example, challenge-response authentication protection (e.g. password protection) and/or cryptographic methods for encryption of the data fragments and/or hashing methods) and/or any other suitable data protection method, process and/or system that may be employed for security purposes to prevent unauthorized access and/or use of the source dataset and/or the associated set of data fragments.

A data protection method may in some embodiments be applied before data is provided from the one or more DS devices 120 to the DT devices 130 for storage thereon and/or during data transmission between the one or more DS devices 120 and DT devices 130 and/or on the set of data fragments stored on DT devices 130.

According to some embodiments, the data protection method may include associating a challenge-response authentication with the source dataset and which is controlled by DTS engine 200. The challenge-response authentication may for example include creating a username and password combination. A username unique to each DS device 120 may for example be generated by DTS engine 200. The username may be generated responsive to a request received at application provider 110 for registering the DS Device 120 and/or responsive to requesting storing a source dataset on DT devices 130 through fragmentation. The end-user associated with the DS device may also be prompted to select a password. The username and the selected password may be encoded in the data fragments and function as the identifier for associating data fragments to the source data. In some embodiments, the username may be determined based on the number of DT devices 130 that may be employed for storing a set of data fragments of the respective source dataset and/or determined based on the amount of storage required for storing the set of data fragments on DT devices 130.

The above-described selection of static and/or dynamic allocation of storage, and/or the static and/or dynamic storing of the set of data fragments may depend on the level of security associated with the corresponding source dataset. For example, in low-level security, the same data fragments of a source dataset may be stored statically; in medium-low level security, the same data fragments may be stored dynamically, but always on the same DT devices 130; in medium-high level security, different data fragments associated with the same source dataset may be generated at least different time stamps and stored on the same DT devices 130; and in high level security, different data fragments associated with the same source dataset may be generated and stored on randomly selected DT devices 130. Clearly, additional or alternative security measures may be employed such as for example the above-mentioned challenge-response and/or encryption.

DTS engine 200 may in some embodiments be configured to identity unauthorized attempts to access data fragments and optionally further be configured to identify the source dataset to which the data fragments are associated with. Responsive to the identification of the unauthorized attempt, DTS engine 200 may notify the administrator of the respective source dataset about such attempt. Notification may for example be provided via an output (not shown) of the one or more DS devices 120 at which the source dataset was provided.

Figure 3:
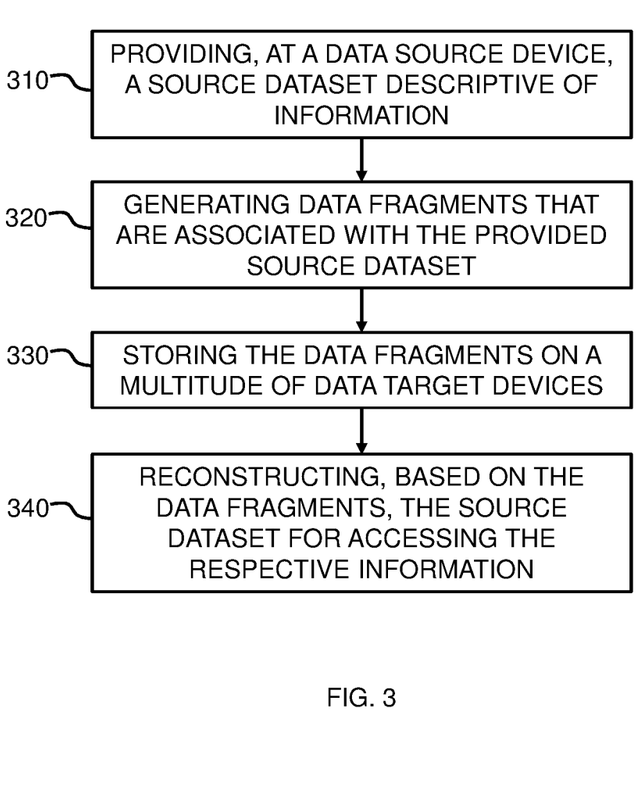
FIG. 3 is a flow chart of a method for the decentralized storing of data, according to an embodiment.

FIG. 3 shows schematically in a flow chart an embodiment of a method for the decentralized storing of data. As indicated by box 310, the method may include providing a source dataset descriptive of information at the one or more DS devices 120. For example, a source dataset descriptive of information may be provided at DS device 120A, e.g., as described above. As indicated by box 320, the method may include generating at least one set of data fragments that is associated with the provided source dataset. In some embodiments, at least some (e.g., most or all) of the generated data fragments of the set may be encrypted. To obtain a set of data fragments of which the at least some or all of the data fragments are encrypted, the method may include encrypting at least some or all of the source data prior to generating the at least one set of data fragments. Alternatively, the method may include encrypting at least some or all of the generated data fragments. In some embodiments, the method may include encrypting at least some or all of the source data to obtain a set of data fragments of which at least some data fragments are encrypted, and may also include not yet encrypted data fragments of the set and/or also include further encrypting data fragments of the set that are already encrypted. As indicated by box 330, the method include storing the at least one set of data fragments on a multitude of DT devices 130. For example, some data fragments of the at least one set may be stored statically and some dynamically at, for example, DT devices 130A-130E, e.g., as described above. As outlined herein above, at least some (e.g., most or all) of the data fragments of the set stored on the multitude of DT devices 130 may be encrypted. It is noted that encryption of data fragments may be performed, e.g., at a DS device 120 and/or at the DT devices 130. As indicated by box 340, the method may include reconstructing, based on the at least one set of data fragments, the corresponding at least one source dataset for accessing the information represented thereby. Reconstruction of the at least one source dataset may, for example, include decrypting, e.g., of the data fragments and/or of the reconstructed source dataset for making the information represented by the set of data fragments accessible by the user of the respective DS device 120. Reconstruction may only be performed if the user authenticated him/herself to a challenge-response authentication protocol. For example, reconstruction may only be performed if the user entered a correct password and username combination.

Figure 4:
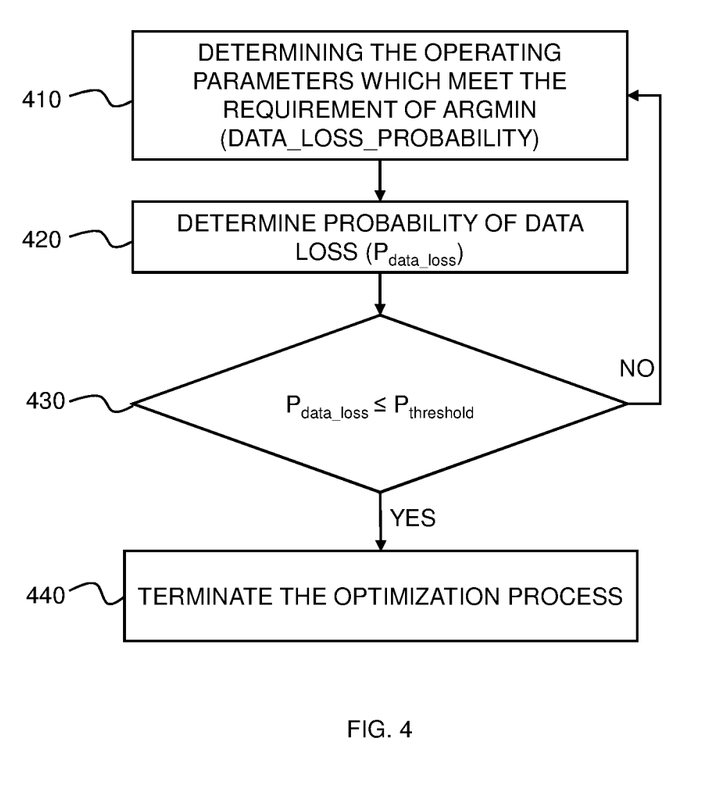
FIG. 4 is a flow chart of a method for optimizing the decentralized storing of data, according to an embodiment.

Further reference is made to FIG. 4. According to some embodiments, DTS system 100 may clone one or more groups of data fragments to reduce the risk that the source dataset cannot be reconstructed. Clearly, the more fragments for a source dataset, the more likely that one of the fragments becomes corrupted or is lost. On the other hand, the smaller the fragments, the smaller their individual impact and the less likely that corruption and/or loss of a fragment (also: group of data fragments) causes the source dataset to become non-reconstructible.

Moreover, the more cloned fragments for a given source dataset, the lower the probability of fatal data loss and/or corruption (i.e., rendering the source data non-reconstructible). The more data fragments and cloned fragments for the same source dataset, the higher the requirements on the computational resources and/or communication capacities. Exemplarily, the management of numerous data fragments may be comparatively complex and further require a comparatively large number of distributed storage devices. Increasing data management complexity may, in turn, negatively impact the stability of DTS system 100 and more prone to failure.

There may thus be tradeoff between the intention to reduce the probability of data loss, stability of DTS system 100 and the required resources. According to some embodiments, DTS engine 200 may be operative and/or configured to optimize between various operating parameters 100, taking into account various system-related constraints and/or quality-of-service (QOS) requirements. The flowchart of a method shown in FIG. 4 exemplifies a method for optimizing system operating parameters. Optionally, these constraints and/or QOS requirements may be predetermined or adjusted dynamically, e.g., as will be outlined in more detail further below.

As indicated by step 410 the method may in some embodiments include the step of determining the parameters of Equation 7 that minimize the probability of data loss. These parameters include:

N—denoting the total number of data fragments; and n—denoting the number of data fragments cloning Exemplarily, in step 410, the system operating parameters may be determined for which a likelihood of data loss is minimized. The resulting operating parameters may then be used for determining a probability of data loss during a certain (e.g., predetermined) time interval. In some embodiments, based on historical data descriptive of information about data losses during a past time interval, a plurality of hypotheses may be established of the likelihood that data loss will occur in the future during a certain time interval measured from a certain point in time. The operating parameters may be determined so that a likelihood of data loss is minimized in the future for the said certain time interval.

As indicated by step 420, the method may include determining, based on the operating parameters, the probability of data loss to occur within the certain time interval. Data loss probability may be determined repeatedly, e.g., periodically, for instance, at intervals equal or shorter than 10 seconds, 9 seconds, 8 seconds, 7 seconds, 6 seconds, 5 seconds, 4 seconds, 3 seconds, 2 seconds, 1 second, 0.5 seconds, 0.1 seconds, 0.01 seconds or less.

As indicated by step 430, the method may include determining if the determined data loss probability meets a certain operation criterion (e.g., $P_{data\_loss} \leq P_{threshold}$). This operation criterion may be predetermined or dynamically adjusted "on-the-fly". This operation criterion may exemplarily reflect a certain QOS and, optionally, be based on empirical data.

In the event that the $P_{data\_loss}$ meets the operation criterion, the optimization method may be terminated (step 440). If not, the optimization method may be continued from step 410. For instance, a plurality of hypotheses may be established anew. If after a certain number of iterations (e.g., >50 iterations) the optimization method does not converge, the operation criterion may be adjusted. For instance, the value $P_{threshold}$ may be increased, e.g., by a predetermined increment.

The various features and steps discussed above, as well as other known equivalents for each such feature or step, can be mixed and matched by one of ordinary skill in this art to perform methods in accordance with principles described herein.

Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, any digital computer system (exemplified herein as DTS system 100) can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to an embodiment of the method disclosed herein. The techniques necessary to achieve this are well known to those skilled in the art and thus are not further described herein. Computer executable instructions implementing an embodiment of a method disclosed herein can be distributed to users on a non-transitory computer-readable medium and are often copied onto a hard disk or other storage medium. When such a program of instructions is to be executed, it is usually loaded into the random access memory of the computer, thereby configuring the computer to act in accordance with a method disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing embodiments of a method disclosed herein. In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

The term "engine" may comprise or be implemented one or more computer modules, wherein a module may be a self-contained hardware and/or software component that interfaces with a larger system. Such module may be embodied by circuit or a controller programmed to cause the system to implement the method, process and/or operation as disclosed herein. A module comprises a machine or machines executable instructions. For example, a module may be implemented as a hardware circuit comprising, e.g., custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Where applicable, although state diagrams, flow diagrams or both may be used to describe embodiments, the technique is not limited to those diagrams and/or to the corresponding descriptions. For example, flow need not move through each illustrated box or state, or in exactly the same order as illustrated and described.

It should be understood that where the claims or specification refer to "a" or "an" element, such reference is not to be construed as there being only one of that element. Unless otherwise stated, the use of the expression "and/or" between the last two members of a list of options for selection indicates that a selection of one or more of the listed options is appropriate and may be made.

The invention claimed is:

1. A system for decentralized and distributed storing of data, comprising:
   an application provider that provides a data storage (DTS) engine of the system;
   wherein the DTS engine is configured to generate data fragments that are associated with a source dataset received at an end-user data source (DS) device, comprising:
      determining parameters for which a likelihood of data loss is minimized, the parameters including at least: a probability that a storage device becomes damaged, a number of the data fragments, and a number of data fragments cloned;
      calculating a probability of data loss during a predetermined time interval based upon the parameters; and
      repeating said determining and said calculating until the probability of data loss is below a threshold,
   wherein the DTS engine is configured such that the generated data fragments are stored on a multitude of end-user data target (DT) devices, and
   wherein the DTS engine is further configured to reconstruct, based on the data fragments, the source dataset.

2. The system according to claim 1, wherein the DTS engine is configured to dynamically allocate data storage on the multitude of end-user DT devices.

3. The system according to claim 1, wherein the DTS engine is configured to dynamically generate data fragments associated with a respective source dataset on the multitude of end-user DT devices.

4. The system according to claim 1, wherein the DTS engine is configured to dynamically store data fragments associated with a respective source dataset on the multitude of DT devices.

5. The system according to claim 1, wherein the DTS engine is configured to generate, with respect to the corresponding source dataset, at least two groups of data fragments, each group consisting of at least two different clusters of data fragments, and wherein the data fragments of the first group arranged in a first cluster are descriptive of the same information as the data fragments of the second group arranged in a second cluster, different from the first cluster.

6. The system according to claim 1, wherein the DTS engine is configured to operate in a first, backup mode, in which the source dataset remains intact; and in a second mode, in which the source dataset does not remain intact.

7. The system according to claim 1, wherein the DTS engine is configured to encrypt the data fragments.

8. The system according to claim 1, wherein the DTS engine is configured to provide a challenge-response protocol required for reconstructing the source data.

9. The system according to claim 5, wherein the source dataset descriptive of information is divided up into at least two groups of data fragments in a manner such that the information represented by the source dataset is not reconstructible unless at least one data fragment of most or each one of the groups of data fragments is accessible.

10. A circuit for controlling a system for decentralized and distributed storing of data, the control circuit comprising:
    a first circuit for generating data fragments that are associated with a source dataset received at an end-user data source (DS) device of the system, said generating comprising:
       determining parameters for which a likelihood of data loss is minimized, the parameters including at least: a probability that a storage device becomes damaged, a number of the data fragments, and a number of data fragments cloned;
       calculating a probability of data loss during a predetermined time interval based upon the parameters; and
       repeating said determining and said calculating until the probability of data loss is below a threshold;
    a second circuit for storing the generated data fragments on a multitude of end-user data target (DT) devices of the system; and
    a third circuit for reconstructing, based on the data fragments, the source dataset.

11. A method for the decentralized and distributed storing of data, comprising:
    receiving a request to generate a set of data fragments respective of a source dataset received at a data source device, wherein generating the set of data fragments comprises:
       determining parameters for which a likelihood of data loss is minimized, the parameters including at least: a probability that a storage device becomes damaged, a number of the data fragments, and a number of data fragments cloned;
       calculating a probability of data loss during a predetermined time interval based upon the parameters; and
       repeating said determining and said calculating until the probability of data loss is below a threshold; and
    storing the at least one set of data fragments on a multitude of end-user data target devices.

12. The method according to claim 11, further comprising: providing at least one identifier for respectively associating the at least one set of data fragments with the corresponding at least one source dataset.

13. The method according to claim 11, further comprising: dynamically allocating storage on the multitude of DT devices.

14. The method according to claim 11, further comprising: dynamically storing the set of data fragments on the multitude of DT devices.

15. The method according to claim 11, further comprising: rendering the source dataset stored on the DS device non-accessible to a user of the DS device.

16. The system according to claim 1, wherein the probability of data loss is determined in accordance with the formula:

$$P_{data\ loss} = \sum_{k=1}^{N} a^{nk}(1 - a^{n(N-k)}) \frac{N!}{K!(N-K)!}$$

wherein a is a probability that a storage device containing a file becomes damaged, N is a total number of data fragments and n denotes the number of data fragments cloned.

17. The method according to claim 11, wherein the probability of data loss is determined in accordance with the formula:

$$P_{data\ loss} = \sum_{k=1}^{N} a^{nk}(1 - a^{n(N-k)}) \frac{N!}{K!(N-K)!}$$

wherein a is a probability that a storage device containing a file becomes damaged, N is a total number of data fragments and n denotes the number of data fragments cloned.

* * * * *